March 25, 1958  C. E. FRANK  2,827,974
POWER STEERING GEAR OF THE HYDRAULIC TYPE
Filed Nov. 4, 1953  2 Sheets-Sheet 1

INVENTOR
Clarence E. Frank
BY
C. H. Dibble
ATTORNEY

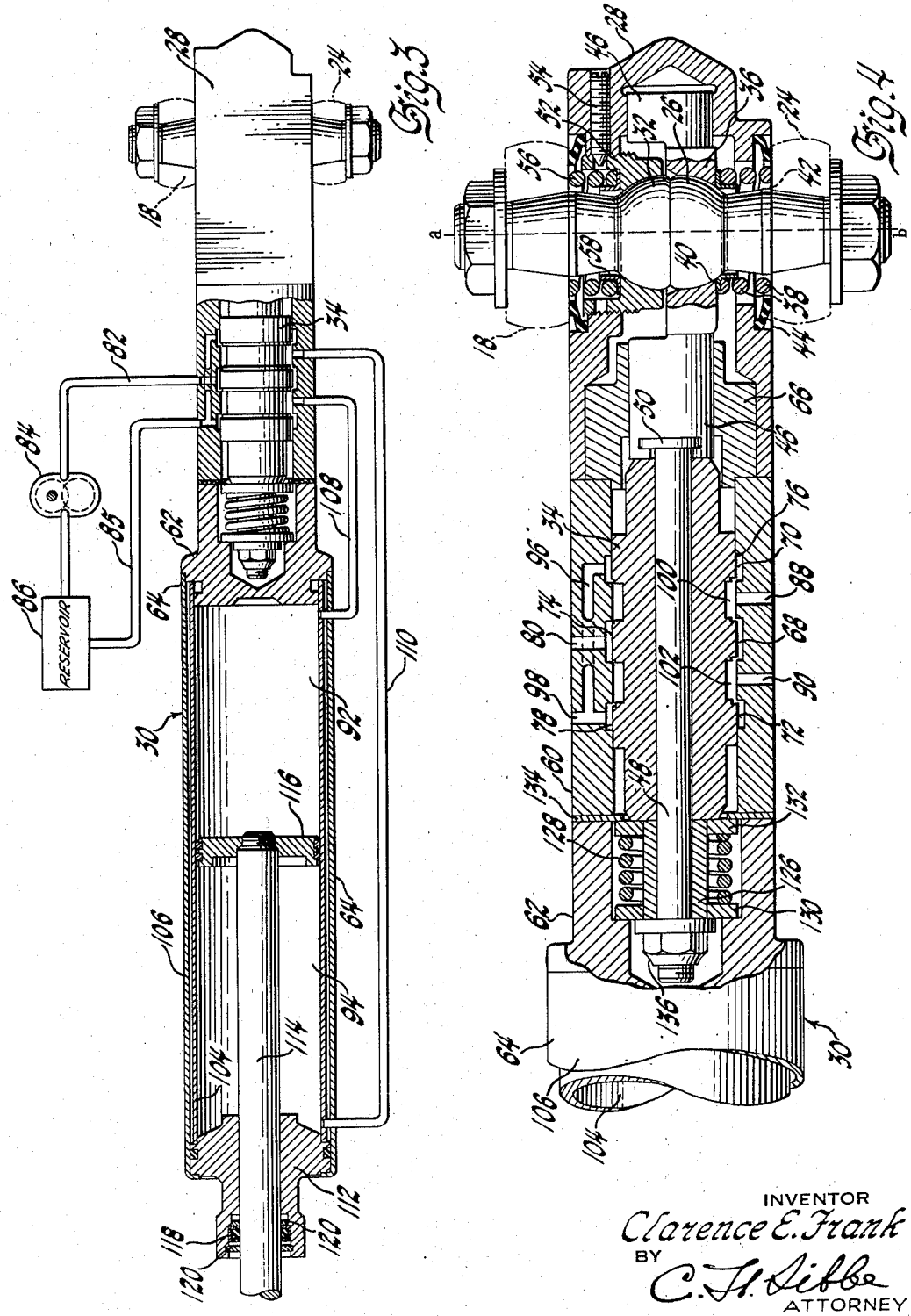

United States Patent Office 2,827,974
Patented Mar. 25, 1958

2,827,974

POWER STEERING GEAR OF THE HYDRAULIC TYPE

Clarence E. Frank, Fraser, Mich., assignor to General Motors Corporation, Detroit, Mich., a corporation of Delaware Application November 4, 1953, Serial No. 390,130

10 Claims. (Cl. 180—79.2)

My invention relates to the power steering of automotive vehicles and the like and more especially concerns a fluid power steering gear particularly distinguished in the means employed to actuate the valve controlling the flow of the fluid medium to the fluid motor.

Recent work in the power steering art has had as its purpose to reduce unit costs and simplify production without loss of operating efficiency, and much has been accomplished in this direction. A major advance is represented by the combined valve and power cylinder construction developed for so-called "linkage boosters," which are to be distinguished from power steering apparatus of the type wherein the control valve is directly associated with or directly actuated by the steering shaft. Gears of the latter type are often referred to as "integral" gears and their use requires substantial modification of conventional steering systems.

Previously proposed fluid power steering gears incorporating the combined valve and power cylinder are of rather limited application because of the nature of the mechanism employed to actuate the valve. Thus, in many cases it is found that smooth performance of the gear is precluded by frictional forces generated incident to the operation of the mechanism.

My invention has as its principal object to provide an actuating mechanism for the purpose indicated, which is so constructed and arranged as to maintain a minimum mount of friction throughout the entire steering range. Other objects and features of the invention will be apparent from the following specific description of a fluid power steering gear incorporating a preferred embodiment thereof. The description will proceed with reference to the accompanying drawings in which:

Figure 3 shows a typical combined valve and power cylinder in longitudinal section (line 3—3 in Figure 1) with certain auxiliary apparatus being represented diagrammatically, and Figure 4 is an enlarged longitudinal section of the control valve including the actuating mechanism.

Figure 1:
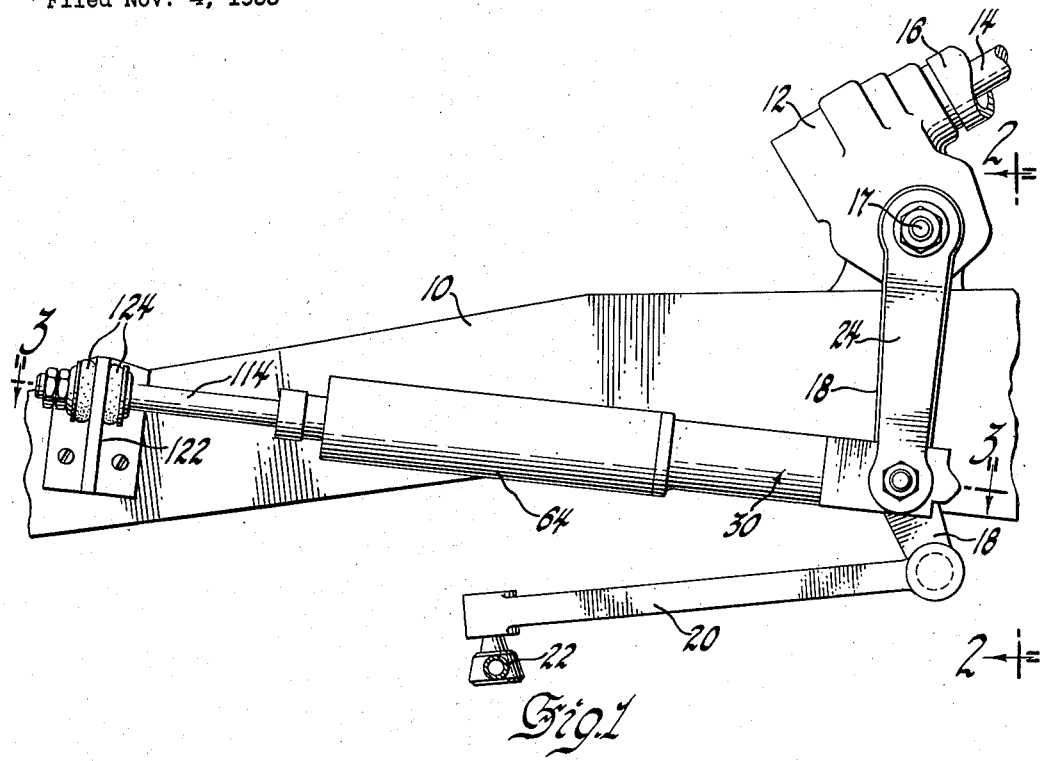
Figure 1 is a fragmentary side elevation showing the particular gear as preferably installed.

Referring now particularly to Figure 1, the numeral 10 denotes a portion of the frame of the vehicle. Supported thereon is a gear box 12 receiving the end of a steering shaft 14, housed in a mast jacket 16 fixedly secured to the gear box. There may be encased in the gear box any suitable type of reduction gearing—see, for example, the gearing disclosed in Hawkins Patent No. 2,267,524.

Figure 2:
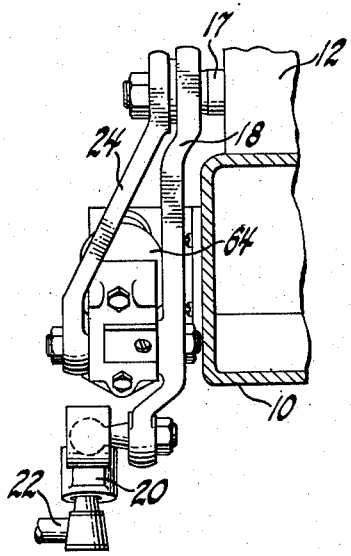
Figure 2 is a view on the line 2—2 in Figure 1.

A rock shaft 17 (Figure 2) representing the output of the reduction gearing extends laterally of the gear box. Pivoted on such shaft is an idler arm 18 which connects at its lower end via a ball and socket joint with a drag link 20, in turn linked through a ball and socket joint to a tie rod 22. The parts beyond the tie rod being conventional description thereof is not considered necessary.

Fixed on the rock shaft 17 over the idler arm is a pitman arm 24, which carries at its lower end a half-ball stud 26 (Figure 4) received within a housing 28 integrated with the valve and cylinder assembly 30. A similar half-ball stud 32 is carried by the idler arm 18 and is received within the housing 28 in juxtaposition to the half-ball stud 26. With the valve spool 34 in neutral or centered position, as shown in Figures 3 and 4, the half-balls 26, 32 lie on substantially the same center line, indicated at a—b in Figure 4.

Half-ball 26 is surrounded by a complementarily formed seat 36 held against the half-ball by a spiral spring 38 which exerts its force against an annular spring seat 40 and against the inner face 42 of the boss at the lower end of the pitman arm. Seat 36 is an integral part of a valve actuating rod 46, which is connected to a stem element 48 extending through the valve spool 34. This connection is made through a flange 50 integral with the stem, the flange being trapped in a recess formed in the rod. A seal 44 prevents the escape of lubricant and the entry of dust and dirt.

A plug-like element 52 threaded into the housing 28 provides a seat for the half-ball 32 carried by the idler arm 18. This element is held in selected position by means of a screw 54, likewise threaded into the housing 28. A spring 56, having a seat 58, functions similarly to the spring 38. The spring seats, it should be observed, allow for easy rotary movement of the springs.

The previously-mentioned valve spool 34 is contained within a housing member 60 suitably secured to the housing member 28 and to a cap piece 62 forming the inner end of the power cylinder 64. A sleeve 66 into which the housing 60 is shouldered provides a bearing for the actuating rod 46.

The valve housing 60 is internally bored to provide annular channels 68, 70 and 72 which are functionally related to the land portions 74, 76 and 78, respectively, of the valve spool. A passageway 80 connects the annular channel 68 to the discharge line 82 (Figure 3) of a pump 84 which draws from a reservoir 86. As indicated, operation of the subject gear by an incompressible fluid such as a mineral oil of suitable viscosity is preferred, although the gear may be adapted for vacuum operation, for example, or for operation with compressed air. The pump and reservoir are shown diagrammatically as these parts are conventional in power steering apparatus. Ordinarily the pump is powered via belt and pulley from the engine of the vehicle.

In addition to passageway 80, the valve housing is fabricated to provide passageways 88, 90 through which fluid passes to the left and right hand chambers 94, 92, respectively of the power cylinder 64. Fluid returned to the reservoir 86 through line 85 leaves the valve via passageway 93 having a branch 96. Passageways 88 and 90 open, respectively, to the annular grooves 100 and 102 between the central land of the valve spool and the end lands thereof, while passageways 96 and 98 communicate with annular channels 70 and 72, respectively.

It is to be noted that the described valve is of the "open center" type, i. e., in the neutral position of the spool, the fluid medium, so long as the pump 84 is operating, continuously circulates through the valve against the static pressure of the fluid in the two chambers of the power cylinder.

The body of the power cylinder 64, as illustrated, is formed of concentric tubular members 104 and 106 (Figure 3). While the connection between the two chambers of the cylinder and the valve is shown as achieved by means of external lines 108 and 110, the construction allows for internal lines if desired. In this connection it will be readily apparent to those skilled in the art that the space between the concentric tubes 104 and 106 may be made use of as a passageway to the left-hand chamber 94 of the cylinder.

An end piece 112 closes the end of the cylinder 64 opposite the control valve and furnishes a bearing for the shaft 114 in the piston 116. The shaft 114 extends through an oil seal 118 confined between two washers 120 for anchorage to a bracket 122 fixedly secured to the frame 10 of the vehicle. Rubber elements 124 serve an obvious purpose.

Reverting to the control valve, it will be seen that the stem 48 carries at its left-hand end a sleeve 126 surrounded by a helical spring 128 positioned between two thrust washers 130, 132. Washer 130 bears against a shoulder provided by the cap piece 62, while washer 132 bears against a ring element 134 mediate the cap piece and the housing 60. The stem 48 is threaded beyond the washer 130 to receive a nut 136 which, considering the flange 50 at the opposite end of the stem, serves to integrate the sleeve 126, the spool 34, and the rod 46 into one functional part. As evident from Figure 1, the axis or center line of such part (and that of the valve-cylinder assembly as a whole) is disposed in a plane angular to the plane of the center line a—b of the half-balls 26, 32.

To describe the operation of the gear, let it be assumed that the steering shaft 14 is rotated clockwise to negotiate a right turn. This brings about a counterclockwise rocking of the shaft 17 and of the pitman arm 24. Now if the resistance to steering exceeds the preloading of the spring 128, which tends to maintain the valve spool 34 centered within its housing, the initial movement of the pitman arm will necessarily displace the shaft 46, and with it the valve spool, rearwardly, thus partially or completely confining the flow of the fluid medium (depending on the exact magnitude of the steering resistance) to the left side of the valve. With the fluid flow so altered, a pressure differential is created within the power cylinder in favor of the chamber 92. Accordingly, the assembly including the cylinder and the valve is caused to move rearwardly to power the idler arm 18 and the drag link 20 in that direction, which corresponds to a rightward turning of the dirigible wheels by reason of the geometry of the particular linkage system contemplated.

As the described action proceeds, the valve housing 60 is constantly seeking to catch up with the the spool 34, so to speak, with the result that simultaneously with cessation of the effort at the steering wheel, it attains a position representing the neutral position of the valve spool.

In the event of a left rather than right turn, it should be obvious that the action will be just the opposite of that above described, the spool in such case being moved forwardly relative to its housing to create a pressure differential in favor of the left-hand chamber of the power cylinder.

The slight turning movement of the half-balls 26, 32 in their corresponding seats, necessarily accompanying the rearward movement of the valve-cylinder assembly meets with a minimum of resistance by reason of the nature of the connection, hence smooth operation of the gear is assured. The clearance between the faces of the two half-balls is only such as to permit the relative longitudinal movement of the half-ball 26 occurring incident to actuation of the valve spool.

The centering spring 128 is desirable in that it gives the operator a "steering feel." The preloading of this spring is arbitrary, representing, for example, from two to eight pounds of effort at the steering wheel. When the steering resistance is of a low value, the steering may be accomplished solely by manual effort, through the assembly, displacement of the valve spool being prevented by force of the spring. Should the power system for any reason fail, the vehicle can be readily steered manually irrespective of the resistance, the effort required being only slightly more than that demanded in the instance of conventional mechanical steering apparatus.

Having thus described and illustrated my invention, what I claim is:

1. In a booster type fluid power steering gear incorporating a unitary assembly combining a power cylinder and a control valve in in-line relation, means for actuating said valve including a pitman arm having associated therewith a connecting element received in said assembly and operatively linked to the working portion of said valve, and an idler arm pivotally supported to rotate about a fixed axis and pivotally connected to a steering linkage member, said idler arm mounting a connecting element received in said assembly in juxta-position to said first connecting element, said connecting elements having substantially the same center line, with the gear in neutral condition, and being so shaped and seated as to allow for a ready turning movement thereof relative to said assembly.

2. A gear according to claim 1 in which the said connecting elements are of hemispherical conformation, the two elements as carried in said assembly together forming a ball.

3. In a booster type fluid power steering gear for automotive vehicles and the like equipped with a mechanical steering assemblage including a steering shaft, reduction gearing and a rock shaft representing the output of the reduction gearing, said power steering gear incorporating a unitary assembly combining a power cylinder and a control valve in in-line relation, means for actuating said valve comprising a pitman arm fixed on said rock shaft having associated therewith a connecting element received in a housing aligned with said assembly, said element being operatively linked to the working portion of the valve, and an idler arm pivoted on said rock shaft and connected to a steering linkage member, said idler arm mounting a connecting element received in said housing in juxta-position to said first connecting element.

4. In a booster type fluid power steering gear for automotive vehicles and the like equipped with a mechanical steering assemblage including a steering shaft, reduction gearing and a rock shaft representing the output of the reduction gearing, said power steering gear incorporating a unitary assembly combining a power cylinder and a control valve in in-line relation, means for actuating said valve comprising a pitman arm rocked by said rock shaft and having associated therewith a connecting element received in a housing aligned with said assembly, said connecting element being pivotally linked to the working portion of the valve to actuate the same, and an idler arm pivotally supported to rotate about a fixed axis and pivotally connected to a steering linkage member, said idler arm mounting a connecting element pivotally received in said housing in juxta-position to said first connecting element.

5. In a booster type fluid power steering gear for automotive vehicles and the like equipped with a mechanical steering assemblage including a steering shaft, reduction gearing and a rock shaft representing the output of the reduction gearing, said power steering gear incorporating a unitary assembly combining a power cylinder and a control valve in in-line relation, means for actuating said valve comprising a pitman arm rocked by said rock shaft and having associated therewith a connecting element received in said assembly, said connecting element being operatively linked to the working portion of the valve, and an idler arm pivotally support to rotate about a fixed axis and pivotally connected to a steering linkage member, said idler arm mounting a connecting element received in said assembly in juxta-position to said first connecting element, said connecting elements being so shaped and seated as to allow for a ready turning movement thereof relative to said assembly.

6. In a booster type fluid power steering gear for automotive vehicles and the like equipped with a mechanical steering assemblage including a steering shaft, reduction gearing and a rock shaft representing the output of the reduction gearing, said power steering gear incorporating a unitary assembly combining a power cylinder and a control valve in in-line relation, means for actuating said valve comprising a pitman arm fixed on said rock shaft having associated therewith a connecting element received in said assembly and operatively linked to the working portion of the valve, and an idler arm pivoted on said rock shaft and connected to a steering linkage member, said idler arm mounting a connecting element received in said assembly in juxta-position to said first connecting element, said connecting elements having substantially the same center line, with the gear in neutral condition, and being so shaped and seated as to allow for a ready turning movement thereof relative to said assembly.

7. In a booster type fluid power steering gear for automotive vehicles and the like equipped with a mechanical steering assemblage including a steering shaft, reduction gearing and a rock shaft representing the output of the reduction gearing, said power steering gear incorporating a unitary assembly combining a power cylinder and a control valve in in-line relation, means for actuating said valve comprising a pitman arm fixed at one end to said rock shaft and having at its other end a half-ball stud received in said assembly on a seat operatively linked to the working portion of the valve, and an idler arm pivotally supported to rotate about a fixed axis and pivotally connected to a steering linkage member, said idler arm mounting a half-ball stud received in said assembly in face to face relation with said first half-ball stud.

8. In a fluid power steering gear, a rock shaft, a pair of arms depending therefrom, one of said arms being fixed to said shaft, the other being pivoted thereon and connected to a steering member beyond the arm fixed to the shaft, a power cylinder operably connected to a steering member, a valve for controlling fluid flow to said cylinder, said valve including a housing portion fixed to said cylinder and a portion movable by the said arm fixed to said shaft through a connecting element having rounded surfaces and a second such element carried in juxtaposition to said first element by said housing portion and serving to interconnect said housing portion and the said other of said arms.

9. In a fluid power steering gear, a rock shaft, a pair of arms depending therefrom, one of said arms being fixed to said shaft, the other being pivoted thereon and connected to a steering member beyond the arm fixed to the shaft, a power cylinder operably connected to a steering member, a valve for controlling fluid flow to said cylinder, said valve including a housing portion fixed to said cylinder and a portion movable by the said arm fixed to said shaft through a connecting element having spherical surfaces and a second such element carried in juxtaposition to and on substantially the same center line as said first element by said housing portion and serving to interconnect said housing portion and the said other of said arms.

10. In a booster type fluid power steering gear incorporating a unitary assembly comprising a power cylinder and a control valve in in-line relation, means for actuating said valve including a pitman arm having associated therewith a connecting element received in a housing aligned with said assembly, said element being pivotally linked to the working portion of said valve to operate the same, and an idler arm pivotally supported to rotate about a fixed axis and pivotally connected to a steering linkage member, said idler arm mounting a connecting element pivotally received in said housing in juxta-position to said first connecting element.

References Cited in the file of this patent

UNITED STATES PATENTS

| | | |
|---|---|---|
| 1,874,248 | Davis | Aug. 30, 1932 |
| 2,022,698 | Vickers | Dec. 3, 1935 |
| 2,356,492 | Smith | Aug. 22, 1944 |
| 2,385,485 | Baade | Sept. 25, 1945 |

FOREIGN PATENTS

| | | |
|---|---|---|
| 704,246 | France | May 15, 1931 |